United States Patent [19]

Migliori

[11] Patent Number: 4,913,399
[45] Date of Patent: Apr. 3, 1990

[54] SOLENOID VALVE ASSEMBLY

[76] Inventor: Luciano Migliori, Via. F.11i Cervi, Residenza dei Cerchi, Milano 2, Segrate, Milan, Italy

[21] Appl. No.: 333,237

[22] Filed: Apr. 5, 1989

[30] Foreign Application Priority Data

Apr. 7, 1988 [IT] Italy ............................. 21027/88[U]

[51] Int. Cl.$^4$ ............................................. F16K 31/06
[52] U.S. Cl. ......................... 251/129.03; 251/129.15; 137/625.65
[58] Field of Search ............. 137/625.65; 251/129.15, 251/129.03

[56] References Cited

U.S. PATENT DOCUMENTS

| | | |
|---|---|---|
| 2,612,907 | 10/1952 | Harris . |
| 2,699,915 | 1/1955 | Goepfrich . |
| 4,552,179 | 11/1985 | Tarusawa et al. ............. 137/625.65 |
| 4,643,393 | 2/1987 | Kosugi et al. . |
| 4,693,275 | 9/1987 | Stoltman ........................ 137/625.65 |

FOREIGN PATENT DOCUMENTS 0139811 5/1985 European Pat. Off. .
2603970 3/1988 France .

*Primary Examiner*—Arnold Rosenthal
*Attorney, Agent, or Firm*—Fleit, Jacobson, Cohn, Price, Holman & Stern

[57] ABSTRACT

A solenoid valve assembly of the type comprising a valve unit and a removable solenoid having an electromagnetic coil, a magnetic core member and a slidable plunger acting on said closing member in opposition to a biasing spring to move said closing member between opposing valve seats at the activation and deactivation of the solenoid; disengageable locking means are provided to removably connect the solenoid to the valve unit. The valve unit comprises a valve body in plastic material and a protective case in which said valve body is fitted; said case having an elongated open slot on a lateral wall opposing to the solenoid, a tube member for the plunger being sealingly connected to the valve body and comprising a flanged end portion fitted between a lateral wall of the protective cases and the valve body, said tube member passing through said open slot.

5 Claims, 2 Drawing Sheets

SOLENOID VALVE ASSEMBLY

BACKGROUND OF THE INVENTION

The present invention refers to electromagnetically operated miniature valves and in particular to a solenoid valve assembly of the type comprising a valve unit and an interchangeable solenoid having a core member and an axially slidable plunger housed in a protective tube protruding into an electromagnetic coil, said valve unit comprising inlet and outlet ports opening into a valve chamber, and a valve member provided in said valve chamber, said plunger of the solenoid acting on said valve member in opposition to a biasing spring to reciprocate said valve member in said valve chamber at the activation and deactivation of the solenoid to open and respectively to close said inlet ports; and disengageable locking means to connect said solenoid to said valve unit.

Valve assemblies of the above type are commercially available and are used in particular in automation systems using compressed air or for controlling the flow of liquids or gases, in which the valve unit usually operates as an interface member between an electronic control unit and a pneumatic or hydraulic device to be controlled, by changing, for example, an electric signal into a hydraulic or pneumatic flow or signal of a set value and time. Said solenoid valve assemblies are known for example from EP-A-0139811, FR-A-2603970 and US-A-4643393.

The solenoid valve assemblies of the above mentioned type are somewhat complex in the structure in that they require a valve unit having a body cast or molded in a single piece of metal or plastic materials, suitably worked to provide inlet and outlet ports and ducts necessary for fluid circulation, as well as the necessary internal components of the valve. In most cases (US-A-4643393 and FR-A-2603970) the valve body is also permanently joined to the solenoid or electromagnetic control unit; this precludes any practical possibility of inspecting the valve and flow paths after the solenoid and valve assembly has been assembled or mounted. All this results in structurally complex valve assembly having high production costs, and with restricted use in that materials capable of withstanding aggressive or high-temperature fluids cannot be used.

From EP-A-0139811 it is also know a miniature solenoid valve assembly having a valve unit and an interchangeable solenoid connected to the valve body by fixing pins passing through the valve body and the solenoid bodies; according to said miniature valve assembly, the valve body and the solenoid may be assembled and disassembled by inserting fixing pins or pulling them out of associates holes in said solenoid and valve body. Furthermore the valve body is cast or molded in a single piece preventing the use of plastic material to resist to gases and corrosive fluids. The valve body is provided with an open cavity for receiving one end of the solenoid, said cavity being in communication with a valve chamber through apertures in the bottom wall of said cavity for the passage of a fork projection of the slidable plunger acting on the valve member in the chamber. Therefore, according to said embodiments, no means have been provided for preventing the leakage of the fluid from the valve, as well as the loss of the sliding plunger in the disassembled condition of the solenoid. The manually operable fixing pins sometime are difficult to remove or to rotate when a small space is provided around the solenoid valve assembly in an assembled and working condition.

With the foregoing problems in view, the present invention has the primary object to provide a miniature solenoid valve assembly in which the solenoid may be simply engaged and disengaged by the valve unit by simply pulling and pushing it, in which the solenoid may be disengaged preventing leakage of fluid from the valve unit and the loss of components the disengaged condition of said valve unit and solenoid units.

A further object of present invention is to provide a solenoid valve assembly as stated above comprising a valve unit of simple design allowing an inspection of the components and withstanding to corrosive fluids while maintaining a comparative low cost.

SUMMARY OF THE INVENTION

The above objects are achieved by means of a solenoid valve assembly according to the invention as described in appended claims, in which the valve unit comprises a valve body in plastic material having inlet and outlet ports opening into a valve chamber, and a protective case for said valve body; a tube element containing the magnetic core and the plunger of the solenoid protruding from, and being sealingly connected to one side of the valve body by means of the protective case, and locking means comprising a clip member on the valve unit engaging and disengaging an annular groove on the solenoid. The use of an outer case to contain and protect the valve body and the provision of magnetic core and plunger members for the solenoid in a protective tube sealingly connected to the valve body, offers several advantage from both structural and functional point of view; in fact the valve body and all its valve component parts can be made of plastic materials, for example a polyester plastic material capable of withstanding aggressive and high-temperature fluids, keeping the whole valve unit suitably protected inside a metal covering case.

The use of clip and groove means to removably connect the solenoid to the valve unit allows the solenoid to be easily replaced, avoiding to disconnect the valve from conduits.

DESCRIPTION OF THE DRAWINGS

These and other advantages of the valve according to the present invention will be apparent from the description, with reference to the attached drawings, in which.

DESCRIPTION OF THE INVENTION

Figure 1:
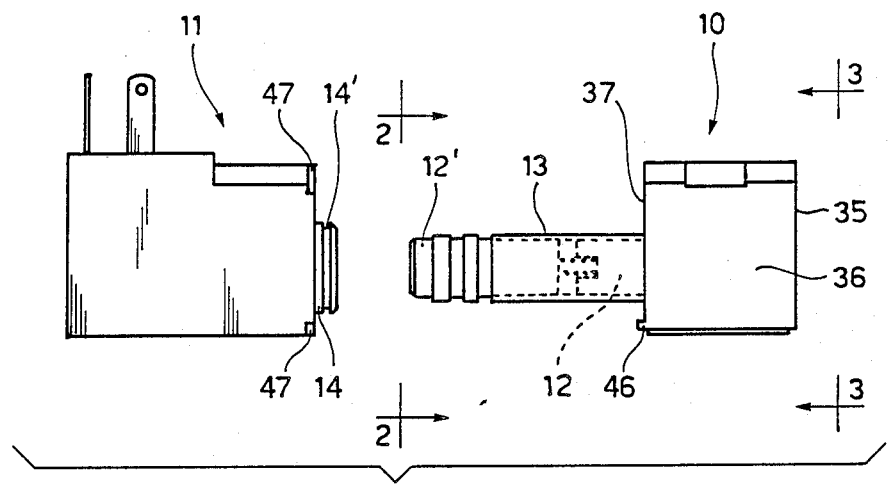
FIG. 1 is a side view of a solenoid valve assembly according to the present invention in disengaged condition.
Figure 2:
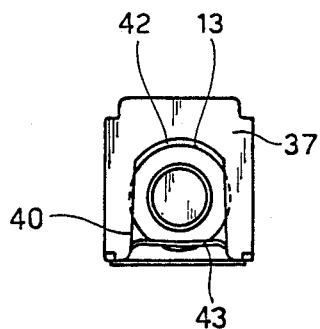
FIG. 2 is a side view from the line 2—2 in FIG. 1.
Figure 3:
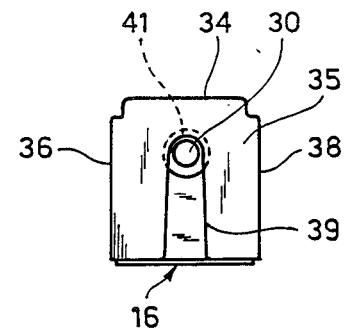
FIG. 3 is view from the line 3—3 in FIG. 1.

As shown in the figures the solenoid valve assembly according to the present invention substantially comprises a valve unit 10 and an electromagnetic control or solenoid unit 11, removably connected to the valve unit 10. The solenoid 11 comprises a magnetic core 12' and a sliding plunger 12 inside a sleeve or tube member 13 sealingly connected to and protruding from one side of the valve unit 10. In the assembled condition of the solenoid valve assembly, the sleeve 13 is disposed inside a coil 15 of the solenoid, passing through a metal bush 14, defining a guide means for said sleeve member 13 during removal and insertion of the solenoid.

According to the present invention, the valve unit 10 comprises a valve body 16, made of plastic material having an inner valve chamber 17 communicating with a circular cavity 18 that opens onto a side of the valve body 16 facing the solenoid 11. The chamber 17 communicates with inlet and outlet ports comprising a first duct 19 for delivery of a fluid, having a valve seat 20 set on one side of a closing valve member 21 movable inside the chamber 17. The chamber 17 also communicates with a second duct 22 as well as a third duct 23 in an additional piece 24 provided inside the cavity 18 so as to present a second valve seat 25 positioned coaxially and opposite to the valve seat 20, with respect to the closing member 21.

The closing member 21 is subject, on one side, to the action of a biasing member or spring 20' opposing the action of the plunger 12 in the sleeve 13, to close against the valve seat 25, allowing connection and delivery of the fluid from the inlet duct 19 to the duct 22, while on the opposite side the closing member 21 is subject to the action exerted by the plunger 12 through an intermediate pusher member 26. The pusher member 26 consists of an annular element having an inner shoulder 27 against which the closing member 21 rests, said member 26 also comprising legs 28 extending through corresponding apertures in the intermediate element 24, on which the end of plunger 12 inside sleeve 13 acts. The action of the solenoid 11 on the closing member 21 is such as to move the latter away from the valve seat 25, bringing it to close against valve seat 20, thus allowing fluid to flow from the duct 22, to the outlet 23, through one or more passages 29 of the annular element 26 or respectively in the peripheral wall of the chamber 17 as schematically shown in FIG. 4.

Figure 5:
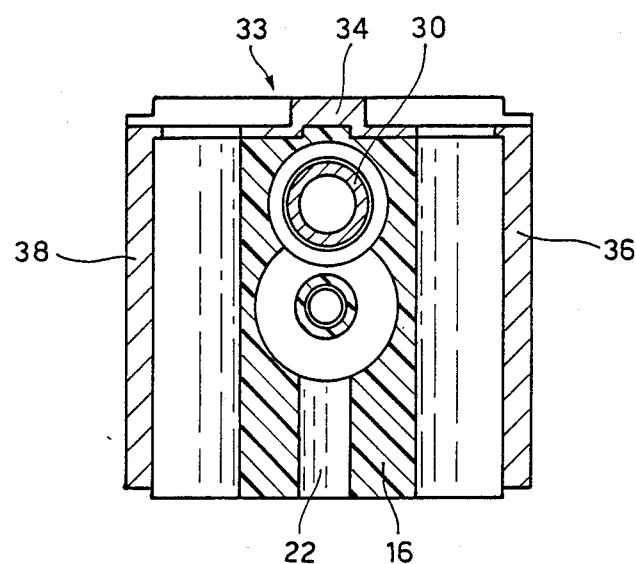
FIG. 5 shows a cross-sectional view along the line 5—5 of FIG. 4.

The valve unit also comprises a manually operable pushbutton 30 accessible from the outer side of the valve body opposite to the plunger 12. The pushbutton 30 slides in a cylindrical seat 31 inside the valve body to urge the opposite edge of the annular element 26 containing the closing member 21, while a spring 32, resting on one side against the bottom wall of the seat 31 and on the other against the bottom of an hole in the pushbutton 30, acts to move the latter into the inoperative position shown in FIG. 5, against a stop surface.

Figure 4:
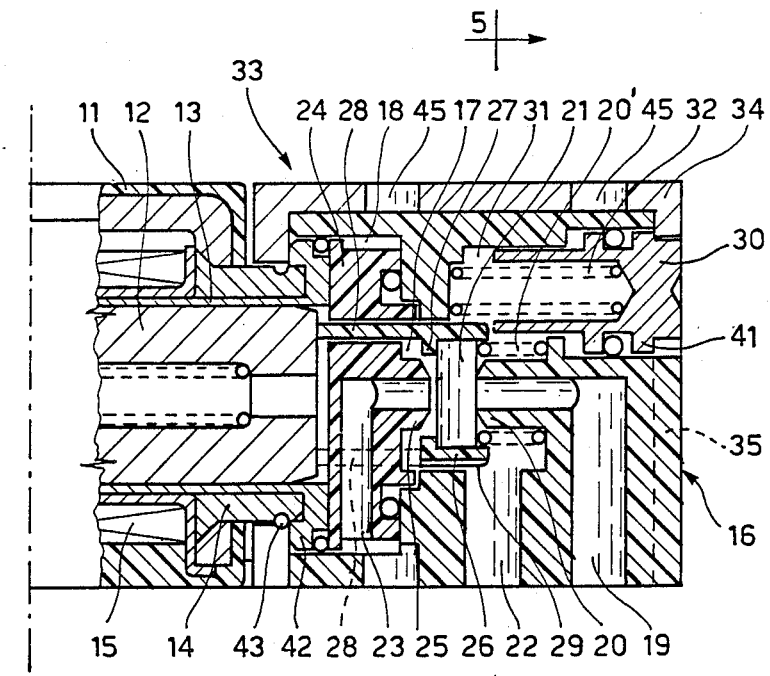
FIG. 4 is an enlarged longitudinal sectional view of the valve assembly in its assembled condition.

According to the present invention all component parts inside the valve body 16, or connected to it, i.e. the sleeve 13 for the plunger 12, the additional piece 24 defining the second valve seat with relative fluid ducts, the closing member 21 with relative pusher member 26, and the manual control pushbutton 30, are kept in the assembled condition of FIG. 4 by means of a protective metal casing, in which the valve body 16 together with all other assembled component parts are simply press-fitted so that all the components are held in the assembled condition by the protective case itself.

The case 33 therefore comprises bottom 34 and side walls 35, 36, 37 and 38 that fit perfectly around the outer faces of the valve body 16. The walls 36 and 37, at the manual control 30 and guide sleeve 13 for the plunger, have elongated slots 39 and 40 respectively, that open at one edge of respective wall to allow the passage for the sleeve 13 and the protruding end of the pushbutton 30 during fitting of the valve body into the case; therefore the pushbutton 30 and sleeve or tube element 13 are provided with annular flanges or collars 41 and 42 having a diameter larger than the cross-width of the aforementioned slots 39 and 40 which are retained by their edges. The flanged end 42 of the tube element 13 is sealingly pressed against the valve body by the case 33; in this manner all parts of the valve are kept adequately assembled by simply inserting the valve body 16 into the case 33. Appropriate seals prevent escape of the fluid to the outside at the manual control pushbutton 30, additional pieces 24, and flanged end portion of the sleeve 13.

According to a further characteristic of the solenoid valve assembly of the present invention, the valve unit 10 and the solenoid 11 are connected together in a releasable manner by engageable and disengageable locking means pressing or pushing one part towards the other, or by pulling in the direction of the axis of the plunger inside the sleeve 13. To this end the bush 14 is protruding from the solenoid and is provided with a peripheral groove 14' close to its end, to engage a spring or clip member 43 provided on the side of the valve body 16 which faces towards the solenoid 11. The end of the sleeve 13 seat in an annular plot on the flanged end portion of the tube member 13 and the clip 43 is fixed to its ends between the valve body 16 and the outer case 33 at the time of assembling to engage said groove.

From what has been said and shown it is clear that a solenoid controlled valve has been provided that offers numerous advantages compared with previously known valves, owing to the use of a protective case 33 which performs various complementary functions, such as the function of containing the whole valve body, which can therefore be made in an extremely economical, low-cost manner, of molded plastic material, as well as the function of keeping the various parts of the valve assembled together, particularly the manual control pushbutton 30, the tube 13 for the plunger 12 which in turn holds the member 24, as well as the retaining clip 43 assembled.

The use of a case 33 to protect and contain the entire valve unit proves advantageous in that it enables the valve unit to be disassembled if necessary for inspection or replacement of some parts; this can be done simply by pushing out the valve body 16 by pushing through holes 45 in the bottom wall 34 of the outer case 33. Lastly, the use of elastically yielding connecting means, proves advantageous in that it permits removal of the valve unit simply by detaching it from the solenoid, which can therefore remain connected to an electrical circuit or to an electrical control apparatus, or vice versa, for inspection and/or replacement.

In order to prevent the valve unit 10 from rotating with respect to the solenoid 11, when coupled together, the outer case 33 of the valve unit is provided with projections 46 that engage with matching seats 47 on the solenoid 11, thus making it possible to orient one part with respect to the other by turning it for example 90° or 180° around the axis of the sleeve 13. It is thus possible to orient the fluid ducts 19, 22 and 23 in the desired position, as required for the intended use.

The electromagnetically controlled valve according to the present invention can be made to any size, however it has proved particularly advantageous for miniature valve assemblies giving rise to a cost saving of about a third compared with conventional valves.

The valve can have various uses; for example it can be used to deliver compressed air or another liquid or gaseous fluid, of inert or aggressive type, according to the technological field of application and the materials used. It is obvious for example that the possibility of making the valve body from thermoplastic materials that withstand even high temperatures, not only makes it possible to make extremely high precision component parts, even for small valves, but also solves the problems of use in chemical sectors or in those using aggressive or high temperature fluids, which in the case of conventional valves would require the use of stainless steel with considerably higher manufacturing costs.

What is claimed is:

1. A solenoid valve assembly of the type comprising a valve unit a removable solenoid having an electromagnetic coil, a magnetic core member and a slidable plunger housed in a tube member protruding into the coil, said plunger being operatively connected with a closing valve member inside a chamber of the valve body; said valve unit comprising inlet and outlet ports opening into the valve chamber containing said closing member, said plunger acting on said closing member in opposition to a biasing spring to move said closing valve member between opposite valve seats at the activation and deactivation of the solenoid, and disengageable locking means to connect the solenoid to the valve unit comprising a valve body in plastic material and a protective case open at one side, said valve body being fitted into said case; said case having at least an elongated open slot on a lateral wall opposing to the solenoid, said tube member for the plunger being sealingly connected to the valve body and comprising a flanged end fitted between said lateral wall of the case and the valve body, said tube member passing through said open slot; guiding means for said tube member comprising a bush member protruding from the solenoid and locking means comprising a peripheral groove at one end of said bush member and a clip member on the valve unit engaging and disengaging said peripheral groove.

2. A solenoid valve assembly according to claim 1, said clip member being provided across said open slot in the side wall of the case both ends of said clip member being fitted between said case and said valve body.

3. A solenoid valve assembly according to claim 1, having a manually operable pushbutton on a peripheral wall, said pushbutton comprising an intermediate collar and stop means for the collar of the pushbutton comprising edge portions of an open slot on a respective side of the case.

4. A solenoid valve assembly according to claim 1, said valve body being removably fitted into said case.

5. A solenoid valve assembly according to claim 1, said protective case comprising hole means on a bottom wall of the case opposite to the open side, to slidably remove said valve body by pushing the same out of the case from said hole means.

* * * * *